US011195152B2

(12) United States Patent
Gallagher et al.

(10) Patent No.: US 11,195,152 B2
(45) Date of Patent: Dec. 7, 2021

(54) CALENDAR AWARE ACTIVITY PLANNER

(71) Applicant: International Business Machines Corporation, Armonk, NY (US)

(72) Inventors: Aiden J. Gallagher, Winchester (GB); Andrew M. Garratt, Andover (GB); David M. Hay, Andover (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/658,468

(22) Filed: Oct. 21, 2019

(65) Prior Publication Data

US 2021/0117927 A1 Apr. 22, 2021

(51) Int. Cl.
*G06Q 10/10* (2012.01)
*G06Q 10/04* (2012.01)
*G01W 1/10* (2006.01)

(52) U.S. Cl.
CPC .......... *G06Q 10/1093* (2013.01); *G01W 1/10* (2013.01); *G06Q 10/047* (2013.01)

(58) Field of Classification Search
CPC .................................................. G06Q 10/047
See application file for complete search history.

(56) References Cited

U.S. PATENT DOCUMENTS

| 7,610,151 B2 | 10/2009 | Letchner | |
|---|---|---|---|
| 10,456,077 B1* | 10/2019 | Chuang | ................ A61B 5/0022 |
| 2002/0055419 A1* | 5/2002 | Hinnebusch | ........... G16H 40/67 |
| | | | 482/8 |
| 2004/0078257 A1* | 4/2004 | Schweitzer | ............ G06Q 10/06 |
| | | | 705/7.21 |
| 2006/0106655 A1* | 5/2006 | Lettovsky | ............ G06Q 10/025 |
| | | | 705/6 |
| 2010/0082376 A1 | 4/2010 | Levitt | |
| 2012/0015778 A1 | 1/2012 | Lee | |
| 2012/0077641 A1* | 3/2012 | Dyer | .................. A63B 22/0605 |
| | | | 482/8 |
| 2012/0084000 A1* | 4/2012 | Wang | .................. G01C 21/3647 |
| | | | 701/426 |
| 2012/0116550 A1 | 5/2012 | Hoffman | |
| 2012/0130630 A1* | 5/2012 | Tang | .................. G01C 21/3415 |
| | | | 701/413 |

(Continued)

FOREIGN PATENT DOCUMENTS

CN 102339357 B 4/2015

OTHER PUBLICATIONS

"BBC Weather", downloaded from the internet on Apr. 10, 2019, 4 pages, <https://www.bbc.com/weather>.

(Continued)

*Primary Examiner* — Sujay Koneru
(74) *Attorney, Agent, or Firm* — Stephen R. Yoder (57) ABSTRACT

Determines an optimal route for a given user to travel from the given user's current physical location to a secondary location so that the given user can perform an exercise routine at the secondary location. In order to determine the optimal route for the given user, at least some of the following factors are considered: the amount of available time the given user has between engagements in his or her daily schedule, the distance between the current location and the secondary location, and the weather.

18 Claims, 3 Drawing Sheets

(56) References Cited

U.S. PATENT DOCUMENTS

| | | | | |
|---|---|---|---|---|
| 2012/0143497 A1* | 6/2012 | Van Hende | ......... | G01C 21/343 701/432 |
| 2013/0283211 A1* | 10/2013 | Malkin | ................. | G06Q 10/06 715/844 |
| 2013/0304377 A1* | 11/2013 | Van Hende | ........... | G01C 21/20 701/533 |
| 2014/0108078 A1* | 4/2014 | Davis | ................ | G06Q 30/0611 705/7.14 |
| 2014/0200944 A1* | 7/2014 | Henriksen | ......... | G06Q 10/1095 705/7.19 |
| 2014/0249878 A1* | 9/2014 | Kaufman | .......... | G06Q 10/1095 705/7.19 |
| 2014/0280219 A1* | 9/2014 | Maser | ............... | G09B 19/0038 707/748 |
| 2014/0316220 A1* | 10/2014 | Sheldon | ................ | G16H 40/67 600/301 |
| 2015/0045068 A1* | 2/2015 | Soffer | .................... | G01C 21/20 455/456.3 |
| 2015/0081210 A1* | 3/2015 | Yeh | .................... | H04L 63/0853 701/428 |
| 2015/0105883 A1* | 4/2015 | Ellis | ..................... | H04W 4/029 700/91 |
| 2015/0119728 A1* | 4/2015 | Blackadar | ............. | G16H 20/30 600/484 |
| 2015/0193722 A1* | 7/2015 | Seaman | ............ | G06Q 10/1095 705/7.15 |
| 2015/0238815 A1* | 8/2015 | Lee | ..................... | G01C 21/343 701/533 |
| 2015/0276419 A1* | 10/2015 | Hashem | ................ | G01C 21/20 701/425 |
| 2015/0293788 A1* | 10/2015 | Pires Dos Reis Moreira | ............. | G06F 1/3234 718/102 |
| 2015/0317582 A1* | 11/2015 | Nath | ............... | G06Q 10/06311 705/7.13 |
| 2015/0364057 A1* | 12/2015 | Catani | ................... | G16H 20/30 434/127 |
| 2016/0135241 A1* | 5/2016 | Gujral | .................... | H04L 67/12 370/328 |
| 2016/0142878 A1* | 5/2016 | Saulnier | ............... | H04W 64/00 455/456.1 |
| 2016/0151674 A1* | 6/2016 | Rauhala | ................. | G16H 20/40 434/247 |
| 2016/0263435 A1* | 9/2016 | Venkatraman | .......... | G01S 19/42 |
| 2016/0275458 A1* | 9/2016 | Meushar | ............ | G06Q 10/1095 |
| 2016/0285982 A1* | 9/2016 | Abercrombie, III | .... | H04L 51/32 |
| 2017/0059337 A1* | 3/2017 | Barker | ................ | G01C 21/362 |
| 2017/0100636 A1* | 4/2017 | Umetsu | ............... | A63B 24/0062 |
| 2017/0263147 A1* | 9/2017 | King | ..................... | G11B 27/026 |
| 2017/0372254 A1* | 12/2017 | Vainas | ............... | G06Q 10/1093 |
| 2018/0001140 A1* | 1/2018 | Mendels | ........... | A61B 5/02438 |
| 2018/0018635 A1* | 1/2018 | Suzuki | .............. | G06Q 10/1093 |
| 2018/0036591 A1* | 2/2018 | King | ........................ | G09B 5/02 |
| 2018/0056130 A1* | 3/2018 | Bitran | ................ | G06F 19/3418 |
| 2018/0060500 A1* | 3/2018 | Ni | .......................... | G16H 10/65 |
| 2018/0085629 A1* | 3/2018 | Gu | ..................... | A63B 24/0003 |
| 2018/0158012 A1* | 6/2018 | Thibodeaux | ... | G06Q 10/063114 |
| 2018/0188695 A1* | 7/2018 | Kumar | .................. | G04G 13/02 |
| 2018/0260792 A1* | 9/2018 | Leclercq | ........... | G06Q 10/1097 |
| 2018/0335310 A1* | 11/2018 | Naoki | ................ | G01C 21/3469 |
| 2018/0374386 A1* | 12/2018 | Benefield | ........... | A63B 71/0686 |
| 2019/0130515 A1* | 5/2019 | Haggiag | .............. | G01C 21/3484 |
| 2019/0160333 A1* | 5/2019 | Dawson | ............. | A63B 24/0062 |
| 2019/0236515 A1* | 8/2019 | Murdock | ............... | G06Q 10/00 |
| 2019/0311539 A1* | 10/2019 | Hogue | ................. | G06T 19/006 |
| 2019/0344123 A1* | 11/2019 | Rubin | ................ | A63B 21/0054 |
| 2020/0285990 A1* | 9/2020 | Sachdeva | ............. | H04L 41/145 |
| 2021/0008413 A1* | 1/2021 | Asikainen | ............ | G06F 3/011 |

OTHER PUBLICATIONS

"iCalendar", App Store Preview, downloaded from the internet on Apr. 10, 2019, 3 pages, <https://itunes.apple.com/us/app/calendar/id492076105?mt=8>.

"Map my run", downloaded from the internet on Apr. 10, 2019, 1 page, <https://www.mapmyrun.com/>.

"Nike Run Club", Run tracking & coaching plans, downloaded from the internet on Apr. 10, 2019, 3 pages, <https://itunes.apple.com/gb/app/nike-run-club/id387771637?mt=8>.

"Workout Plan: Fitness Schedule on the App Store", RCR Solutions, Ltd., 5 pages, downloaded from the internet on Apr. 10, 2019, <https://itunes.apple.com/gb/app/workout-plan-fitness-schedule-journal/id461729711?mt=8>.

* cited by examiner

CALENDAR AWARE ACTIVITY PLANNER

BACKGROUND

The present disclosure relates generally to the field of exercise planning and athletic training, and more particularly to logistical and scheduling aspects of exercise planning and athletic training.

Typically, when people are trying to lose weight, maintain weight or be active in their daily lives, people will often want to perform exercises around their busy day-to-day schedule.

US patent application 2015/0081210 ("Yeh") discloses as follows: "The instructions configure the processor for accessing calendar information including scheduled events of a user, accessing map information, accessing location information indicating current location of the user, receiving user input indicating a desire for route information, based at least in part on time constraints indicated from the calendar information, accessing the location information and map information to determine a route . . . . Based on time constraints indicated from the calendar information, the processor accesses the location information and map information to determine a route [for exercising] . . . [T]he logic accesses weather and/or climate information (e.g., current and/or future/predicted weather information) . . ."

SUMMARY

According to an aspect of the present invention, there is a method, computer program product and/or system that performs the following operations (not necessarily in the following order): receiving a calendar information data set, with the calendar information data set including information indicative of a daily schedule of events of a first user; receiving an exercise goal data set, with the exercise goal data set including information indicative of a plurality of exercise goals of the first user; receiving a location information data set, with the location information data set including information indicative of: a current physical location of the first user, and a physical location where the first user can achieve at least one exercise goal of the plurality of exercise goals; determining that the first user has a first gap in time between at least two events in the daily schedule of events; determining that an exercise goal of the plurality of exercise goals can be achieved by the first user during the first gap in time; and generating a first route for the first user in order to achieve the exercise goal during the first gap in time.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Some embodiments of the present invention use machine logic-based rules to determine an optimal route for a given user to travel from the given user's current physical location to a secondary location so that the given user can perform an exercise routine at the secondary location. In order to determine the optimal route for the given user, some embodiments of the present invention consider at least some of the following factors: the amount of available time the given user has between engagements in his or her daily schedule, the distance between the current location and the secondary location, and the weather.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
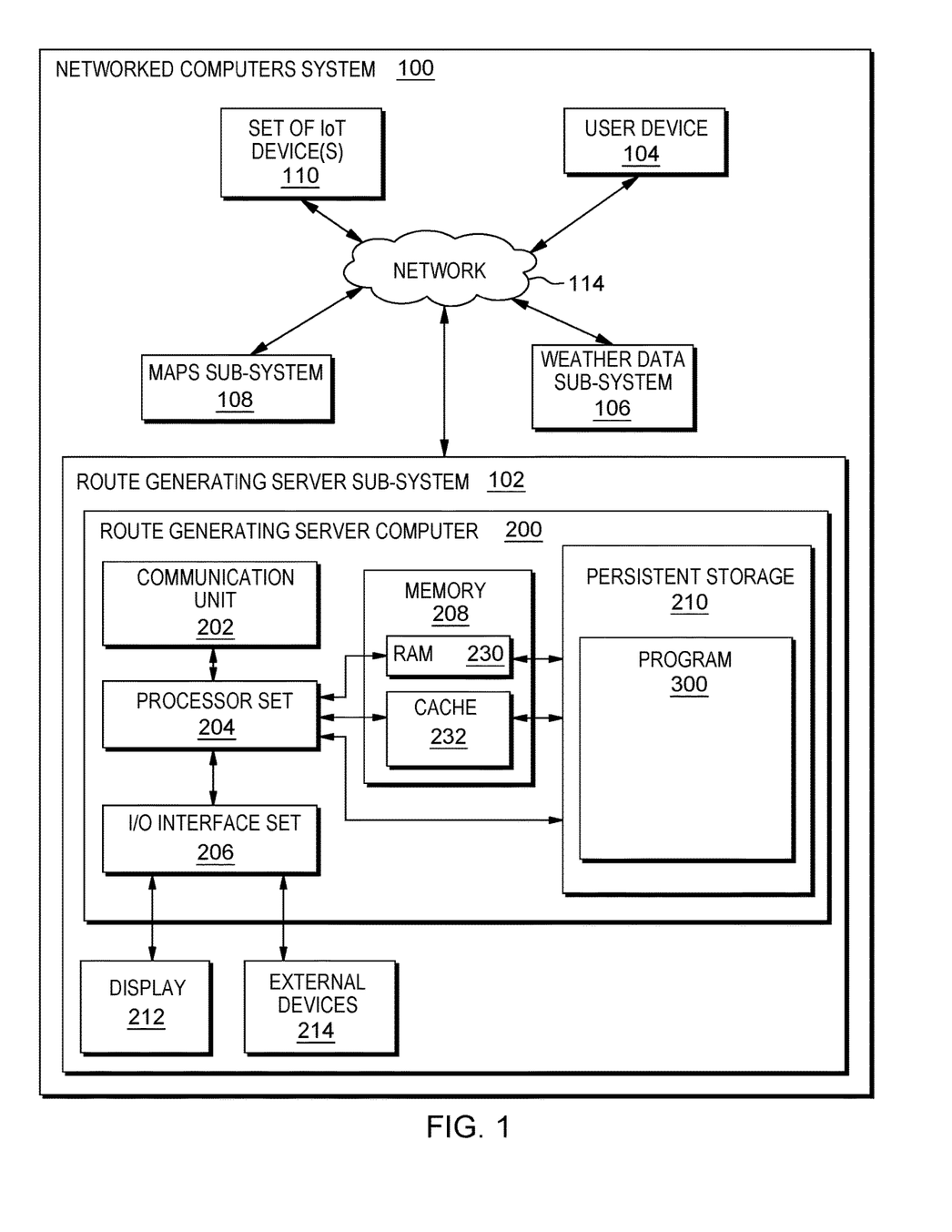
FIG. 1 is a block diagram view of a first embodiment of a system according to one embodiment of the present invention.

An embodiment of a possible hardware and software environment for software and/or methods according to the present invention will now be described in detail with reference to the Figures. FIG. 1 is a functional block diagram illustrating various portions of networked computers system 100, including: route generating server sub-system 102; user device 104; weather data sub-system 106; maps sub-system 108; set of IoT (Internet of Things) device(s) 110; communication network 114; route generating server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
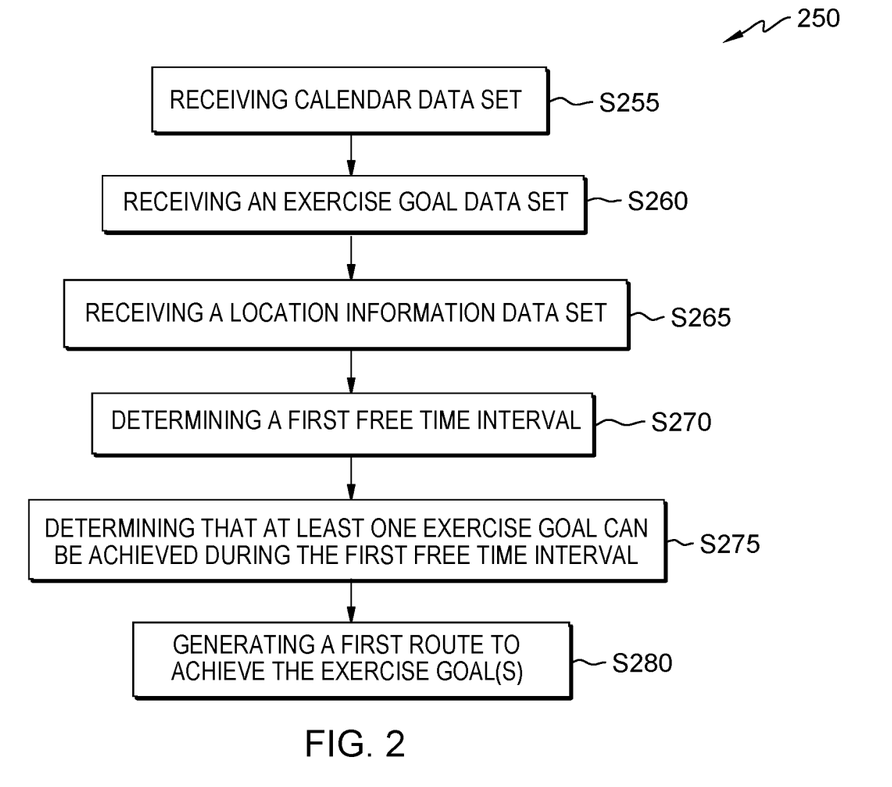
FIG. 2 is a flowchart showing a first embodiment method performed, at least in part, by the first embodiment of the system.
Figure 3:
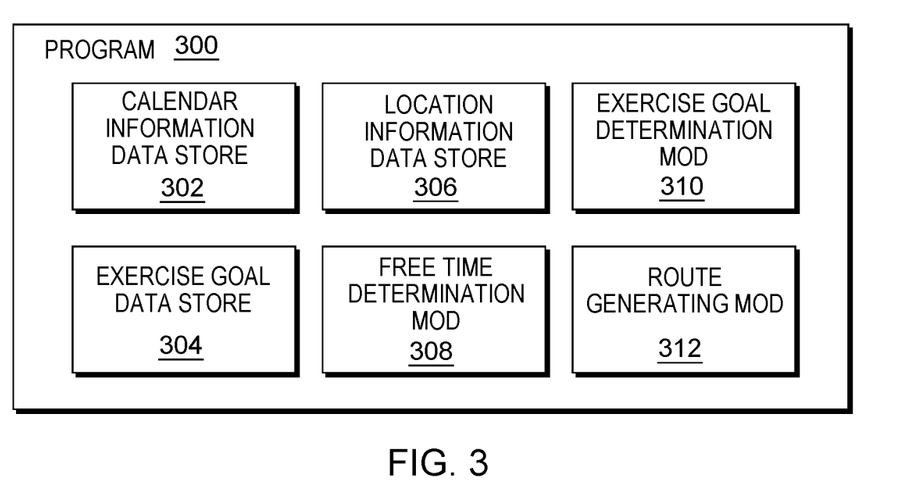
FIG. 3 is a block diagram showing a machine logic (for example, software) portion of the first embodiment of the system.

FIG. 2 shows flowchart 250 depicting a method according to an embodiment of the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where a calendar information data set is received from calendar information data store 302. The calendar information data set includes information indicative of: (i) a user's daily scheduled activities/events; (ii) the user's preferred work schedule (for example, 9 AM to 5 PM); (iii) the user's preferred leisure schedule (for example, 6:15 PM to 7:45 PM); (iv) priority of an event on the user's daily scheduled activities/events (for example: "The Company-Wide Quarterly Meeting on Monday morning cannot be rescheduled under any circumstances, but the Team Meeting can be rescheduled under certain circumstances); and/or (v) the location of the user's daily scheduled activities/events (for example: if the user has a meeting in a first office building from 9 AM to 10 AM and another meeting in a second office building from 1 PM to 2 PM, it can be determined that there is an exercise window between 10 AM and 1 PM when the user has to travel from the first office building to the second office building, which can be a significant distance in some cases).

In some embodiments of the present invention, there is a method for calculating a route between the first and the second office building that considers the following: (i) time of travel between the two office buildings; (ii) current weather conditions; and/or (iii) how much exercise the user wishes to undertake in a given day. For example, if it takes fifteen (15) minutes to walk from the first office building to the second office building using the shortest route, then the method can suggest that the user follow a route that requires a minimum of a thirty (30) minute walk. Additionally, in this example, the method can suggest that the user should take this walk from 11 AM to 11:30 AM because it will be raining outside from 9 AM to 11 AM.

In some embodiments, the user's daily scheduled activities/events is received through input from user device 104, communicated through communication network 114, and to calendar information data store 302. Alternatively, calendar information data store 302 is automatically updated based on user input from a computing device (not shown) that is different from user device 104.

User device 104 is any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Processing proceeds to operation S260, where an exercise goal data set is received from exercise goal data store 304. The exercise goal data set includes information indicative of: (i) the user's current body weight; (ii) the user's desired body weight; (iii) the user's preference for performing aerobic exercises; (iv) the user's preference for performing anaerobic exercises; (v) a plurality of exercise routines that the user can perform in a respectively corresponding plurality of time periods; and/or (vi) the user's preference for a time period in which to exercise (for example, a thirty minute interval). In some embodiments of the present invention, the information included in the exercise goal data set is entered on user device 104, communicated through communication network 114, and to exercise goal data store 304.

Alternatively, some of the information included in the exercise goal data set (such as the user's desired body weight or preference for performing aerobic exercises) is automatically updated based on user behavior. For example, user behavior includes the user consistently selecting aerobic exercises to perform over anaerobic exercises. In this example, the exercise goal data set would be updated to indicate that the user would like to receive more recommendations to perform aerobic exercises, and fewer recommendations to perform anaerobic exercises.

Processing proceeds to operation S265, where a location information data set is received from location information data store 306. The location information data set includes information indicative of: (i) a current location of the user; (ii) a plurality of exercise locations where the user can perform an exercise routine that matches the user's exercise goals (as discussed in connection with the exercise goal data set in operation S260, above); (iii) a map of the user's office building; (iv) a map of the user's current location (such as a hotel where the user is staying while on a work-related event); and/or (v) a map of the plurality of exercise locations.

In some embodiments of the present invention, the location information data set, in part, is received from user device 104 and/or a set of Internet of Things (IoT) device(s) 110, communicated through communication network 114, and to location information data store 306. Alternatively, the location information data set is received from maps sub-system 108, communicated through communication network 114, and to location information data store 306. In some embodiments, maps sub-system 108 is a central repository that receives, stores and/or processes Global Positioning System (GPS) data received from set of IoT device(s) 110. Alternatively, maps sub-system 108 is a central repository that receives, stores and/or processes maps data that is not GPS data received from set of IoT device(s) 110 and is updated periodically.

Set of IoT device(s) 110 is any set of consumer connected device(s) and/or set of enterprise/industrial level device(s) that are capable of: (i) communicating data to weather sub-system 106; and (ii) measuring weather-related data. Weather-related data includes at least the following: wind direction, wind speed, temperature, barometric pressure, dew point, sky cover, etc.

Processing proceeds to operation S270, where free time determination module ("mod") 308 determines a first free time interval of a user based upon information received from calendar information data store 302. In some embodiments, free time determination mod 308 takes into account the length of time in which the user prefers to exercise (such as one hour).

Throughout the remainder of this discussion, the following two scenarios will be discussed to illustrate certain embodiments of the present invention: (1) free time determination mod 308 determines that the user has a period of three hours free between two business engagements in the daytime; and (2) free time determination mod 308 determines that the user has a period of fifteen minutes available.

Processing proceeds to operation S275, where exercise goal determination mod 310 determines that at least one exercise goal can be achieved during the first free time interval determined above in connection with operation S270. With respect to the first example (discussed above in connection with operation S270), exercise goal determination mod 310 does the following: (i) takes into account that the user prefers to exercise for one hour even though the user has three hours to spend; (ii) selects a sub-set of exercise routines from the exercise goal data set (as discussed above in connection with S260); and (iii) presents the selected sub-set of exercise routines so that the user can select at least one exercise routine.

With respect to the second example (discussed above in connection with operation S270), exercise goal determination mod 310 does the following: (i) takes into account that the user prefers to exercise for one hour even though the user only has fifteen minutes to spend; (ii) determines that there are no exercise routines that can be completed in fifteen minutes; (iii) modifies a sub-set of exercise routines so that they can now be completed in fifteen minutes; and (iv) presents the modified sub-set of exercise routines so that the user can select at least one exercise routine.

Figure 4:
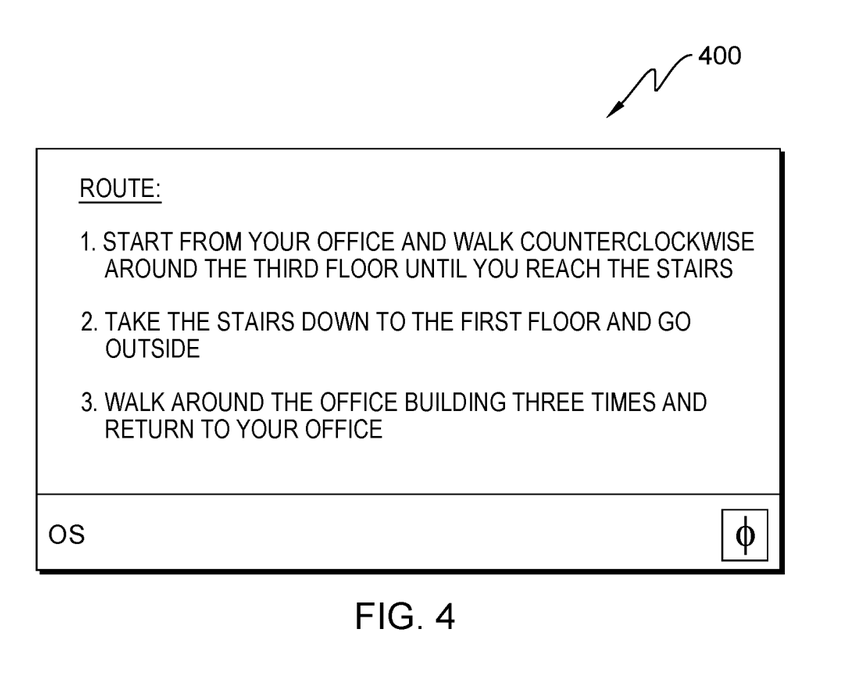
FIG. 4 is a screenshot view generated by the first embodiment system.

Processing proceeds to operation S280, where route generating mod 312 generates a first route so that the user can achieve his or her exercise goal(s). In some embodiments, route generating mod 312 presents the user with "route" (shown in this example as a set of human-readable instructions) to follow in order to achieve the user's exercise goal. For example, screenshot 400 of FIG. 4 shows one example of a "route." Screenshot 400 shows that the generated route includes a three-step set of human-readable instructions, which are: (1) start from your office and walk counterclockwise around the third floor until you reach the stairs; (2) take the stairs down to the first floor and go outside; and (3) walk around the office building three times and return to your office.

Alternatively, route generating mod 312 can generate a route in the form of a guided path on a map that the user can follow from the user's current location to an end location, with the guided path including activities for the user to perform. For example, the guided path can include directions from the user's home to a nearby park, with instructions to perform a given exercise at a given location along the path to the nearby park (such as: "perform one hundred jumping jack exercises when you are two blocks away from the park entrance").

In some embodiments of the present invention, route generating mod 312 generates routes for the user based upon weather data received from weather data sub-system 106. In this embodiment, set of IoT device(s) 110 collects weather data, communicates the weather data through communication network 114, and to weather data sub-system 106. In some embodiments of the present invention, weather data sub-system 106 is a central repository that receives, stores and/or processes weather-related data received from set of IoT device(s) 110.

In some embodiments of the present invention, route generating mod 312 updates a generated route based upon the weather data. For example, consider the following two pieces of information: (1) route generating mod 312 generates a first route for the user in the morning so that the user can perform his or her exercise routine in the evening; and (2) an unexpected storm advisory is issued in the afternoon. In this example, route generating mod 312 modifies the first route so that the user can perform his or her exercise routine at the user's current location. Alternatively, route generating mod 312 generates a second route so that the user can perform his or her exercise routine on either the same day or a different day, with the second route being completely different than either the first route or the modified first route.

III. Further Comments and/or Embodiments

Some embodiments of the present invention recognize the following facts, potential problems and/or potential areas for improvement with respect to the current state of the art: (i) when people are trying to lose weight, maintain weight or be active in their day to day lives, people will often want to exercise around their busy day to day schedule in a manner that is most convenient to them; (ii) often people will have to plan a route at a given time based on the time they have (that is, they will have to chart out an optimal path to find a place to exercise, such as the gym, within a time period that is equivalent to the amount of time of exercise plus time of travel); (iii) although existing applications can suggest routes, none sync up with calendars to suggest exercise types and routes based on available time for a specific user and the users typical speed when travelling; and/or (iv) users often want to get exercise, but might find that possible activities affected by the weather (for example, it could be too icy on the roads to cycle, too wet/muddy to run a typical route, too hot to run prolonged periods outdoors).

In some embodiments of the present invention, there is a method that uses calendar information to plot free time against routes that can be taken to get some exercise. These routes can be mapped per location and can be aware of locations where a person is likely to be at a given time due to commitments, or appointments, entered into her computerized calendar. These "commitment locations" can be used in order to map a convenient start and/or end point for an exercise route.

Some embodiments of the present invention may include one, or more, of the following features, characteristics and/or advantages: (i) depending upon a user's preference for convenience versus privacy, accesses relevant data such as the user's schedule, location, required activity levels, achievement against targets, time-of-day, exercise habits and preferences, local weather etc.; (ii) makes recommendations based upon all and/or some of these above-mentioned factors in order to enable the given user to do the right type and amount of exercise in a timely fashion; (iii) recommends different routes for different levels of exertion; (iv) offers personalised recommendations for the user by considering factors such as the weather over a given period of time such as a day, week or a month; (v) suggests potential exercises for the user based on their exercise goals for the same period of time; (vi) gives weather dependent exercise choices by accessing a series of the user's known memberships to gyms, sports centers, etc.; (vii) gives weather dependent exercise choices by using existing applications such as the weather, location services, and the user's calendars.

Some embodiments of the present invention may include one, or more, of the following features, characteristics and/or advantages: (i) a method that uses input from users electronic calendars (such as email system calendar and integrated device calendars) to find when users have free time to do some daily exercises; (ii) integrates with existing applications to find how much exercise a user wants to achieve on a given day to match activity or calorie targets; (iii) utilizes the user's current location to calculate possible routes that the user can take to reach their target in a given 'gap' (that is, a gap in time) between calendar commitments; (iv) uses a fitness application user setting(s) to retrieve user metrics (such as height, weight, average exercise speed, calorie target and activity target) in order to plan the a multitude of routes based on different level of exercises intensity and method (such as walking, running and cycling); (v) determine where the route would start and where the route would end based on user commitment locations; (vi) maps various routes as suggestions based on this determination; (vii) allows the user to explicitly state when he or she wishes to end a current "trip" at the same location he or she started at for cases where the user needs to drive or otherwise travel to his or her next commitment; (viii) in these cases, it can be determined how much time the user needs to get to the next location; and/or (ix) alternatively, application settings can be used to get information on the usual method of transport.

Some embodiments of the present invention may include one, or more, of the following features, characteristics and/or advantages: (i) checks the weather in any location; (ii) determines and sees which days best suit the activities the user has planned for a given period of time; (iii) if a user plans to have three gym sessions and a running session over a single week, and at the same time there is a single non-raining day, then the user will receive a recommendation that the user should have his or her outdoor running session on the non-raining day; (iv) makes recommendations over a longer period of time; (v) checks the weather at regular intervals in order to make updates and make recommendations if circumstances change; (vi) makes safety recommendations such as an ice warning before an outdoor run; and/or (vii) if the user has a free period (such as a cancelled meeting) the user would be recommended to go exercise in a best place from a weather point of view during this new free period, rather than later as initially planned because the likelihood of rain is greater later then it is now.

In some embodiments of the present invention, when in an office space (that is, a physical office location), the user can upload a map of the current office with room details, which allows the system to tell the travel time between offices and possible routes to each location. In other embodiments of the present invention, a user is recommended to circle the office space or travel to a different location to perform an exercise routine. This recommendation is useful when the user has to navigate similar indoor spaces, such as large hotels and conference centers. For example, navigating a conference in Las Vegas can allow a user to walk more than ten (10) miles per day between venues, which easily exceeds 20,000 steps. Similarly, large hotels may require the user to walk for 5-10 minutes between locations (such as from the reception area to a hotel room or a breakfast room). Additionally, embodiments of the present invention can alert the user with potential recognized opportunities to perform an exercise routine between calendar spaces during the user's work day.

For example, if the user has a spare hour, the user can get alerted that he or she can perform a 30 minute cycling target with this route now.

In the following paragraphs, multiple examples will be used to illustrate embodiments of the present invention.

In the first example, the scenario involves a user that has just finished a long meeting and has thirty (30) minutes of free time before going into a second meeting. In this example, embodiments of the present invention perform at least the following actions (not necessarily in the following order): (i) mapping a first location (location A) and a second location (location B), where location A and location B are in the same building; (ii) based on the fact that location A and location B are in the same building, planning a circular route for the user to take; (iii) using past exercise data to determine distance that the user is able to travel and the exercise intensity; (iv) checking the mode of travel the user currently uses (for example, walking to work); (v) alerting the user that there are pre-planned routes; (vi) displaying multiple routes for the user to take at different speeds; (vii) displaying exercise-related information such as the number of calories that the user has burned performing the given exercise and the distance traveled by the user; (viii) having the user check various routes; (ix) having the user select a walking intensity that is desirable to the user (such as a "normal" walking pace); (x) showing a plurality of routes that include information relating to how much time the user has between work commitments (for example: several routes are shown that leave five (5) minutes after work commitment A and five minutes before work commitment B); and/or (xi) having the user select a route.

In the second example, the scenario involves a user that has nearly finished his or her work and is going to have a meal one hour afterwards. In this example, embodiments of the present invention perform at least the following actions (not necessarily in the following order): (i) mapping a first location (location A) and a second location (location B), with location A and location B being three (3) miles apart from each other; (ii) using past exercise data to determine distance that the user is able to travel and the exercise intensity; (iii) checking the mode of travel the user currently uses (for example, walking to work); (iv) tracking routes to location B; (v) alerting the user that he or she can walk to their preferred restaurant to have his or her meal; (vi) displaying multiple routes for the user to take at different speeds; (vii) displaying exercise-related information such as the number of calories that the user has burned performing the given exercise and the distance traveled by the user; (viii) having the user check walking routes; (ix) having the user select a preferred walking route; and/or (x) having the user walk in accordance with the selected walking route and at the recommended walking pace.

In the third example, a method of an embodiment of the present invention will be described in the following context: a new user is working at a single location and does not have any connected devices. The method includes the following underlying assumptions: (i) a user downloads an application and gives the application permission to access calendar and location; (ii) every given period of a configurable time X (such as fifteen (15) minutes), the application checks the accessed calendar; (iii) users are allowed to configure a minimum and maximum exercise duration (such as thirty (30) minutes) in the event that the user has one (1) free hour between two meetings (between 11:00 AM and 12:00 PM).

In this scenario, the application performs the following operations (not necessarily in the following order): gets current location information and available time (for example: the user has thirty (30) minutes because he or she is preparing for the next meeting) of the user; (ii) checks if the user's normal travel speed is available through connected apps; (iii) if the user's normal travel speed information is not available, then the application uses standard averages for walking, jogging, running, cycling (for example: 3 mph, 5 mph, 7 mph, 12 mph) that a user can update manually in the settings; (iii) determines distance to travel based on time available and travel speeds (for example: walking 1.5 miles, jogging 2.5 miles, running 3.5 miles, cycling 6 mph); (iv) uses a map of the area with current location as starting point; (v) plots ends of every street or path for a radius of "distance" with individual markers; (vi) calculates distance from a starting point marker to other markers using a set number of possible combinations (for example: the first 5 journeys that match the distance and ending at next calendar events location, where no given location is default to same location); (vii) if there are three (3) markers (start location, location 2 and location 3), then there would be 3 possible 'journeys'—start location to location 2 and back, start location to location 3 and back, start location to location 2 to location 3 and back; (viii) returns a subset of these locations with distance and time to complete for each of the travel types; (ix) displays options on a single screen to the user; (x) allows a user to select an option that shows the journey on a map (and then the user either accepts the option or returns to the previous screen); and/or (xi) when a journey is accepted, the user can follow the journey using an in-app navigation system or set of text/audio instructions.

In the fourth example, a method of an embodiment of the present invention will be described in the following context: a user having a connected exercise application. The method includes the following underlying assumptions: (i) a user opens the connected exercise application and connects to the application; (ii) the user gives the application permission to access the user's past exercise and user profile information (such as: height, weight, age, average pace per exercise type, etc.); (iii) for every given period of configurable time X (such as fifteen (15) minutes), the application checks the connected calendar; and (iv) the application determines that the user has free one hour between two meetings (for example, between 11:00 AM and 12:00 PM).

According to this method, the embodiments of the present invention perform the following operations (not necessarily in the following order): (i) gets current location and available time (such as thirty (30) minutes because of preparing for next meeting) of the user; (ii) checks if the user's normal travel speed is available through the connected application; (iii) uses this data (however, if a travel type (that is, the mode of travel for the user such as walking) is not defined, the application uses standard averages for walking, jogging, running, cycling (for example: 3 mph, 5 mph, 7 mph, 12 mph); (iv) determines distance to travel based on time available and travel speeds (for example: walking 1.5 miles, jogging 2.5 miles, running 3.5 miles, cycling 6 mph); (v) generates a route (discussed further in the following paragraphs); (vi) gets an existing route by: (a) getting all previous exercise data from the application, (b) checking start and end location of the user, (c) checking distance to the desired location and the amount of time taken to travel to the desired location, and (d) storing each unique route to provide to the user; (vii) returns a subset of these locations with distance and time information to complete for each of the travel types; (viii) displays options on a single screen to the user; (ix) allows a user to choose to only see unique routes (e.g., routes that do not directly take the user to their desired location, etc.); (x) compares a given route to known exercise application routes in order to filter suggestions; (xi) allows a user to select an option that shows the journey on a map; (xii) allows the user to either accept the given journey or return to the previous screen; (xiii) when a journey is accepted, the user follows the journey using an in-application navigation system or set of text/audio instructions; and/or (xiv) turns on the connected application to track the exercise routine being performed.

According to this method, a route is generated by performing the following operations (not necessarily in the following order): (i) using a map of the area with current location as starting point; (ii) plotting ends of every street or path for a radius of 'distance' with individual markers; and/or (iii) calculating distance from a starting point marker to other markers using a set number of possible combinations (for example: the first five (5) journeys that match the distance and end at the next calendar events location, and where there is no location given, then default to the same location). Here, if there are three (3) markers (start location, location 2 and location 3), then there would be three possible "journeys"—start location to location 2 and back, start location to location 3 and back, start location to location 2 to location 3 and back.

In the fifth example, a method of an embodiment of the present invention will be described in the following context: using internal and external maps. The method includes the following underlying assumptions: (i) a user provides a uniform resource location (URL) address and access to a customer site map that includes room numbers (and in at least some instances a search function for individual rooms); and (ii) the application notices an available twenty (20) minutes between two meetings (the first meeting being on the east ground floor and the second meeting being on the west wing of the third floor).

According to this method, the embodiments of the present invention perform the following operations (not necessarily in the following order): (i) gets current location and available time information (for example: there is a fifteen (15) minute break period because the user needs to rest before his or her next meeting); (ii) finds distance between meeting room one and meeting room two (for example: the distance between meeting room one and meeting room two is 300 meters); (iii) determines distance to travel based on time available for the user and the user's indoor walking speed; (iv) maps variant routes between meeting room one and meeting room two (discussed in further detail in the following paragraph); (v) plots corners and stairs by placing "point markers" along with overlaying the internal map with an external map view to plot relative distance from one room to another across different paths; (vi) calculates distance from a start point marker to other markers using a set number of possible combinations (for example: (a) the first five (5) journeys that match the distance and end at next calendar events location; (b) where there is no location given, then default to the same location; and (c) if there are three (3) markers (start location, location 2 and location 3), then there would be three possible "journeys"—start location to location 2 and back, start location to location 3 and back, start location to location 2 to location 3 and back); (vii) returns a subset of these locations with distance and time to complete for each of the travel types; (viii) displays options on a single screen to the user; (ix) allows a user to selects an option which shows the journey on a map; (x) allows the user to either accept the journey or return to the previous screen (when the journey is accepted, the user can follow using an in-application navigation system or set of text/audio instructions); and/or (xi) turns on the connected application to track the user's exercise routine.

Mapping variant routes between meeting rooms can include at least the following: (i) an indoor only route that takes into consideration the number of stairs and "longer" routes from walking to a further away staircase); (ii) receives input from a user to set a minimum or maximum elevation per trip to avoid being routed to walk up twenty (20) flights of stairs; (iii) receives input from a user to set a minimum or maximum elevation per given time period to allow the user to rest while climbing multiple flights of stairs; (iii) can be an external (outdoor) route that includes the walk through the building (such as leaving through one door, circling the building twice and entering at a different location nearer the meeting room); and/or (iv) can be a combination of indoor and outdoor routes (such as walking out of a building and into another door, across a floor to another exit, round to the original exit/entrance and back up to meeting room two).

In the sixth example, a method of an embodiment of the present invention will be described in the following context: using weather knowledge to schedule exercise. The method includes the following underlying assumptions: (i) the application determines that the user has ninety (90) minutes of free time between 12:00 PM and 1:30 PM; and (ii) the application completes a weather check using a connect weather service and determines that it is currently raining heavily.

According to this method, the embodiments of the present invention perform the following operations (not necessarily in the following order): (i) gets current location and available time information (for example: the user has eighty (80) minutes because he or she is preparing for his or her next meeting); (ii) finds a start and end location (for example, this start and end location is the user's office building because it is currently raining heavily); (iii) factors in "internal" activities that the user can perform; (iv) uses a map lookup of local leisure centers or the user's own allocated gym: (v) calculates the travel time to each local leisure center; (vi) selects the activities available to be performed; (vii) factors in typical time for the user to get changed and/or shower for each leisure activity either through a hard coded number that is configurable by the user or through learning over a period of sessions; (vii) suggests the time available to workout at the leisure center as a possible "route" as well as each of the activity types (such as swimming, gym, tennis, indoor football, etc.); (viii) displays options on a single screen to the user; (ix) allows a user to select an option which shows the journey to the location on a map; (x) allows the user to either accept the journey or return to the previous screen (when a journey is accepted, the user can follow the journey using an in-app navigation system or set of text/audio instructions as well as seeing a countdown of time before the user needs to be ready and leave the leisure center).

In the seventh example, a method of an embodiment of the present invention will be described in the following context: using weather predictions throughout the day to schedule exercise. The method includes the following underlying assumptions: (i) the application determines that the user has ninety (90) minutes of free time between 12:00 PM and 1:30 PM and an forty-five (45) minutes of free time between 2:30 PM and 3:15 PM; and (ii) the application completes a weather check using a connect weather service and determines that it is raining heavily between 11:00 AM and 2:00 PM and that it is only cloudy between 2:00 PM and 5:00 PM.

According to this method, the embodiments of the present invention perform the following operations (not necessarily in the following order): (i) gets current location and available time (for example: the user has eighty (80) minutes because he or she is preparing for his or her next meeting); (ii) finds a start and end location. In this example, the same location (for example, this start and end location is the user's office building because it is currently raining heavily); (iii) factors in "internal" activities that the user can perform; (iv) uses a map lookup of local leisure centers or the user's own allocated gym: (v) calculates the travel time to each local leisure center; (vi) selects the activities available to be performed; (vii) factors in typical time for the user to get changed and/or shower for each leisure activity either through a hard coded number that is configurable by the user or through learning over a period of sessions; (vii) suggests the time available to workout at the leisure center as a possible "route" as well as each of the activity types (such as swimming, gym, tennis, indoor football, etc.); (viii) completes a flow for an outdoor activity for the later time period of 2:30 PM to 4:15 PM with an available time of forty (40) minutes for the later start and end locations; (ix) displays options on a single screen to the user to include both the current exercises that can be completed at the given moment and also the option to schedule an exercise to be performed at a later time; (x) allows the user to select an option that shows the journey to the location on a map; (xi) allows the user to either accept the journey or return to the previous screen (when a journey is accepted the user can follow using an in-app navigation system or set of text/audio instructions as well as seeing a countdown of time before he or she needs to be ready and leave the leisure center).

Some embodiments of the present invention may include one, or more, of the following features, characteristics and/or advantages: (i) considers the weather (over a period of time) to plan exercise session(s) in advance based on existing weather patterns; (ii) for example, the user could go for a run today, but he or she only needs to do three (3) runs this week and will be recommended to run tomorrow instead because the following day is much sunnier; (iii) makes use of a local gym, leisure center, or an in-office workout area to achieve a workout goal that would be more relevant to the user because of the outside weather; (iv) records additional step changes from internal routes in order to offer variant routes around the office to reach the next meeting which achieves a greater step output heading towards an overall daily workout goal; (v) is aware of the current weather and future weather predictions; (vi) specifically, recommendations would be improved by showing to the user that "it is sunny tomorrow, walk in your free slot then and go to the museum today because it is raining"; and/or (vii) incorporates a user's work commitments and start and end necessities when making an exercise route recommendation.

Some embodiments of the present invention may include one, or more, of the following features, characteristics and/or advantages: (i) user calendar information is used to plot free time against routes that can be taken to get the user some exercise, where the routes are mapped per location and can be aware of commitment locations in order to map a definitive start and end point; (ii) recommends different routes for different levels of exertion to the user based on user's personal factors by accessing/collecting a slew of relevant data including the user's schedule, user's past exercise, location, travel type, travel speed, required activity levels, achievement against targets, time-of-day, exercise habits and preferences, local weather, and the like; (iii) accesses calendar information including scheduled events of a user; (iv) accesses map information; (v) accesses location information indicating current location of the user; (vi) generates exercise routes to the user that would allow the user enough time to complete the route yet still honor the user's appointments as denoted on the calendar; (vii) recommends altering exercise routes to the user based on the user's personal factors by accessing/collecting a slew of relevant data including the user's schedule, user's past exercise, location, and the like; and/or (viii) suggests personal activities to be performed during free time slots of a user schedule such as a calendar application, where in suggesting the personal activities in the geographic area includes hiking, taking a brief walk, sightseeing, going to a restaurant nearby, and the like.

In some embodiments of the present invention, a "calendar aware exercise planner" uses a given user's work and/or personal calendar information to plot free time against routes that can be taken so that the given user can get some exercise. These routes are mapped per location and can be aware of commitment locations (that is, where the given user currently must be prior to exercising) in order to map a definitive start and end point. Depending upon the user's preference for convenience and privacy, embodiments of the present invention can access a slew of relevant data, including the user's schedule, location, required activity levels, achievement against targets, time-of-day, exercise habits and preferences, local weather, etc. By making use of this information, the calendar aware exercise planner can make recommendations based upon all or some of these factors in order to enable the given user to do the right type and amount of exercise in a timely fashion. Alternatively, embodiments of the present invention recommend different routes based different desired levels of physical exertion that the user wants to experience during his or her exercise session.

Some embodiments of the present invention may include one, or more, of the following features, characteristics and/or advantages: (i) evaluates weather over a given period for exercise goals (such as over a one week period) with calendar knowledge, which results in smarter decisions and/or recommendations for the user; (ii) factors in a series of indoor exercises that might be possible to perform nearby (such as a local gym, indoor walking routes such as an office interior); (iii) considers internal routing (uses office maps) to make small increases in user step totals in order to help the user reach his or her exercise goal by taking a longer route to his or her next meeting; (iv) considers weather and exercise goals; (v) considers weather over time to plan in advance based on existing weather patterns (for example, the following determination can be made: "the user could run today, but he or she only needs to do 3 runs this week and tomorrow is much sunnier"); (vi) makes use of a local gym, leisure center or in-office workout area to achieve an exercise goal that would be more relevant because of the outside weather; (v) records additional user step count changes from internal routes in order to offer variant routes around the office for the user to reach his or her next meeting that achieves a greater step output heading towards an overall daily goal; and/or (vi) aware of the current weather and future weather predictions (for example, some embodiments can make the following determination for the user: "it is sunny tomorrow, walk in your free slot then and go to the museum today because it is raining").

In one embodiment of the present invention, there is a method for creating routes/exercise goal plans that takes into account weekly and monthly targets. According to this method, if a given user wants to perform a set of exercise activities in a given month, and work-related event(s) come up that disrupt the performance of the set of exercise activities, then the exercise activity that overlaps with the work-related event(s) will be automatically rescheduled. For example, the given user wants to perform the following exercise activities in a given month: (i) three swims; (ii) one tennis match; and (iii) six runs. After these exercise activities have been scheduled, an unexpected meeting arises that directly conflicts with the tennis match, but not the other activities. In this instance, the tennis match would automatically be rescheduled so that the user can still play in the tennis match in the given month and attend the unexpected meeting.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
receiving a calendar information data set, with the calendar information data set including information indicative of a daily schedule of events of a first user;
receiving an exercise goal data set, with the exercise goal data set including information indicative of a plurality of exercise goals of the first user and a plurality of user exercise preferences;
receiving, from a set of Internet of Things (IoT) devices communicated through a first communication network, a location information data set, with the location information data set including information indicative of: a current physical location of the first user, and a physical location where the first user can achieve at least one exercise goal of the plurality of exercise goals, with the set of IoT devices being capable of measuring weather-related data for the purpose of transmitting that weather-related data through the first communication network;
sending, by the set of IoT devices and through the first communication network, the location information data set to a device of the first user;
determining that the first user has a first gap in time between at least two events in the daily schedule of events;
uploading, by the first user, map information data, with the map information data including information indicative of an office layout;
determining that an exercise goal of the plurality of exercise goals needs to be modified based, at least in part, upon the location information data set in order to adjust for the first user having the first gap in time between the at least two events in the daily schedule of events;
modifying the exercise goal so that the exercise goal can be achieved by the first user during the first gap in time; and
generating a first route for the first user in order to achieve the exercise goal during the first gap in time based, at least in part, upon the map information data, with the first route being a defined geographical path that the first user can travel in order to achieve the exercise goal based upon the plurality of user exercise preferences and the first gap in time that is within the parameters of the office layout.

2. The CIM of claim 1 further comprising:
receiving a first weather data set, with the first weather data set including information indicative of a current weather status;
responsive to the generation of the first route, determining whether the exercise goal can be achieved by the first user based, at least in part, upon the current weather status; and
responsive to the determination that the exercise goal can be achieved by the first user based upon the current weather status, achieving, by the first user, the exercise goal.

3. The CIM of claim 1 further comprising:
receiving a first weather data set, with the first weather data set including information indicative of a current weather status;
responsive to the generation of the first route, determining whether the exercise goal can be achieved by the first user based, at least in part, upon the current weather status; and
responsive to the determination that the exercise goal cannot be achieved by the first user based upon the current weather status, generating a second route for the first user so that the first user can achieve the exercise goal during the first gap in time.

4. The CIM of claim 1 wherein the first route is a defined path between the current physical location of the first user and the physical location where the first user can achieve the exercise goal.

5. The CIM of claim 3 wherein:
the second route is a defined path between the current physical location of the first user and the physical location where the first user can achieve the exercise goal; and
the first route is different than the second route.

6. The CIM of claim 1 further comprising:
responsive to the determination that the first user has a first gap in time between at least two events in the daily schedule of events, determining whether the first gap in time is sufficiently large enough for the first user to achieve the one exercise goal.

7. A computer program product (CPP) comprising:
a machine readable storage device; and
computer code stored on the machine readable storage device, with the computer code including instructions and data to cause a processor(s) set to perform operations including the following:
  receiving a calendar information data set, with the calendar information data set including information indicative of a daily schedule of events of a first user,
  receiving an exercise goal data set, with the exercise goal data set including information indicative of a plurality of exercise goals of the first user and a plurality of user exercise preferences,
  receiving, from a set of Internet of Things (IoT) devices communicated through a first communication network, a location information data set, with the location information data set including information indicative of: a current physical location of the first user, and a physical location where the first user can achieve at least one exercise goal of the plurality of exercise goals, with the set of IoT devices being capable of measuring weather-related data for the purpose of transmitting that weather-related data through the first communication network,
  sending, by the set of IoT devices and through the first communication network, the location information data set to a device of the first user,
  determining that the first user has a first gap in time between at least two events in the daily schedule of events,
  uploading, by the first user, a map information data, with the map information data including information indicative of an office layout,
  determining that an exercise goal of the plurality of exercise goals needs to be modified based, at least in part, upon the location information data set in order to adjust for the first user having the first gap in time between the at least two events in the daily schedule of events,
  modifying the exercise goal so that the exercise goal can be achieved by the first user during the first gap in time, and
  generating a first route for the first user in order to achieve the exercise goal during the first gap in time based, at least in part, upon the map information data, with the first route being a defined geographical path that the first user can travel in order to achieve the exercise goal based upon the plurality of user exercise preferences and the first gap in time that is within the parameters of the office layout.

8. The CPP of claim 7 further comprising:
receiving a first weather data set, with the first weather data set including information indicative of a current weather status;
responsive to the generation of the first route, determining whether the exercise goal can be achieved by the first user based, at least in part, upon the current weather status; and
responsive to the determination that the exercise goal can be achieved by the first user based upon the current weather status, achieving, by the first user, the exercise goal.

9. The CPP of claim 7 further comprising:
receiving a first weather data set, with the first weather data set including information indicative of a current weather status;
responsive to the generation of the first route, determining whether the exercise goal can be achieved by the first user based, at least in part, upon the current weather status; and
responsive to the determination that the exercise goal cannot be achieved by the first user based upon the current weather status, generating a second route for the first user so that the first user can achieve the exercise goal during the first gap in time.

10. The CPP of claim 7 wherein the first route is a defined path between the current physical location of the first user and the physical location where the first user can achieve the exercise goal.

11. The CPP of claim 9 wherein:
the second route is a defined path between the current physical location of the first user and the physical location where the first user can achieve the exercise goal; and
the first route is different than the second route.

12. The CPP of claim 7 further comprising:
responsive to the determination that the first user has a first gap in time between at least two events in the daily schedule of events, determining whether the first gap in time is sufficiently large enough for the first user to achieve the one exercise goal.

13. A computer system (CS) comprising:
a processor(s) set;
a machine readable storage device; and
computer code stored on the machine readable storage device, with the computer code including instructions and data to cause the processor(s) set to perform operations including the following:
  receiving a calendar information data set, with the calendar information data set including information indicative of a daily schedule of events of a first user,
  receiving an exercise goal data set, with the exercise goal data set including information indicative of a plurality of exercise goals of the first user and a plurality of user exercise preferences,
  receiving, from a set of Internet of Things (IoT) devices communicated through a first communication network, a location information data set, with the location information data set including information indicative of: a current physical location of the first user, and a physical location where the first user can achieve at least one exercise goal of the plurality of exercise goals, with the set of IoT devices being capable of measuring weather-related data for the purpose of transmitting that weather-related data through the first communication network,
  sending, by the set of IoT devices and through the first communication network, the location information data set to a device of the first user, determining that the first user has a first gap in time between at least two events in the daily schedule of events, uploading, by the first user, a map information data, with the map information data including information indicative of an office layout, determining that an exercise goal of the plurality of exercise goals needs to be modified based, at least in part, upon the location information data set in order to adjust for the first user having the first gap in time between the at least two events in the daily schedule of events, modifying the exercise goal so that the exercise goal can be achieved by the first user during the first gap in time, and generating a first route for the first user in order to achieve the exercise goal during the first gap in time based, at least in part, upon the map information data, with the first route being a defined geographical path that the first user can travel in order to achieve the exercise goal based upon the plurality of user exercise preferences and the first gap in time that is within the parameters of the office layout.

14. The CS of claim 13 further comprising:

receiving a first weather data set, with the first weather data set including information indicative of a current weather status;

responsive to the generation of the first route, determining whether the exercise goal can be achieved by the first user based, at least in part, upon the current weather status; and responsive to the determination that the exercise goal can be achieved by the first user based upon the current weather status, achieving, by the first user, the exercise goal.

15. The CS of claim 13 further comprising:

receiving a first weather data set, with the first weather data set including information indicative of a current weather status;

responsive to the generation of the first route, determining whether the exercise goal can be achieved by the first user based, at least in part, upon the current weather status; and responsive to the determination that the exercise goal cannot be achieved by the first user based upon the current weather status, generating a second route for the first user so that the first user can achieve the exercise goal during the first gap in time.

16. The CS of claim 13 wherein the first route is a defined path between the current physical location of the first user and the physical location where the first user can achieve the exercise goal.

17. The CS of claim 15 wherein:

the second route is a defined path between the current physical location of the first user and the physical location where the first user can achieve the exercise goal; and the first route is different than the second route.

18. The CS of claim 13 further comprising:

responsive to the determination that the first user has a first gap in time between at least two events in the daily schedule of events, determining whether the first gap in time is sufficiently large enough for the first user to achieve the one exercise goal.

* * * * *